United States Patent
Yano (10) Patent No.: US 11,947,856 B2
(45) Date of Patent: Apr. 2, 2024

(54) IMAGE PROCESSING APPARATUS, IMAGE PROCESSING METHOD, PROGRAM, AND RECORDING MEDIUM

(71) Applicant: FUJIFILM Corporation, Tokyo (JP)

(72) Inventor: Hironori Yano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/589,166

(22) Filed: Jan. 31, 2022

(65) Prior Publication Data

US 2022/0261199 A1 Aug. 18, 2022

(30) Foreign Application Priority Data

Feb. 17, 2021 (JP) .................................. 2021-023439

(51) Int. Cl.
*G06F 3/12* (2006.01)

(52) U.S. Cl.
CPC .......... *G06F 3/1285* (2013.01); *G06F 3/1205* (2013.01); *G06F 3/1253* (2013.01)

(58) Field of Classification Search
CPC .... G06F 3/1285; G06F 3/1205; G06F 3/1253; G06F 3/1211; G06F 3/1244; G06F 3/126; Y02D 10/00
See application file for complete search history.

(56) References Cited

U.S. PATENT DOCUMENTS

| | | | |
|---|---|---|---|
| 7,586,524 B2 * | 9/2009 | Tsue ..................... | G11B 27/034 |
| | | | 348/231.2 |
| 2007/0196099 A1 * | 8/2007 | Ishiyama ........... | H04N 1/32795 |
| | | | 396/301 |
| 2009/0017795 A1 | 1/2009 | Guichard et al. | |
| 2010/0058174 A1 | 3/2010 | Yamamoto | |

(Continued)

FOREIGN PATENT DOCUMENTS

| | | |
|---|---|---|
| JP | 2007-193616 A | 8/2007 |
| JP | 2007-194966 A | 8/2007 |

(Continued)

*Primary Examiner* — Helen Zong
(74) *Attorney, Agent, or Firm* — Studebaker & Brackett PC (57) ABSTRACT

A user can comfortably perform an ordering operation of a print product even in a case where a bandwidth of a network is insufficient.

In an image processing apparatus, an image processing method, a program, and a recording medium according to an embodiment of the present invention, an instruction receiving unit receives, as inputs, an image and an instruction of image processing to be performed on the images, and a first image processing unit performs first image processing corresponding to the instruction of image processing on the image to generate a first image after the image processing based on the image and the instruction of image processing received from the instruction receiving unit via a global network. A transmission decision unit decides whether or not to transmit the image and the instruction of image (Continued)

processing to the first image processing unit based on a type of the instruction of image processing, and controls the instruction receiving unit to transmit the image and the instruction of image processing to the first image processing unit in a case where the transfer controller decides to transmit the image and the instruction of image processing to the first image processing unit.

16 Claims, 6 Drawing Sheets

(56) References Cited

U.S. PATENT DOCUMENTS

| | | | |
|---|---|---|---|
| 2014/0193047 A1* | 7/2014 | Grosz | G06Q 10/10 |
| | | | 382/118 |
| 2015/0116767 A1* | 4/2015 | Sasaki | G06F 3/1256 |
| | | | 358/1.15 |
| 2018/0150265 A1* | 5/2018 | Oguma | H04N 1/00347 |
| 2021/0209215 A1* | 7/2021 | Qin | G06F 3/04845 |
| 2023/0179811 A1* | 6/2023 | Jinnouchi | H04N 21/4227 |
| | | | 725/86 |

FOREIGN PATENT DOCUMENTS

| | | |
|---|---|---|
| JP | 2008-502249 A | 1/2008 |
| JP | 2008-117308 A | 5/2008 |

* cited by examiner

IMAGE PROCESSING APPARATUS, IMAGE PROCESSING METHOD, PROGRAM, AND RECORDING MEDIUM

CROSS-REFERENCE TO RELATED APPLICATIONS

The present application claims priority under 35 U.S.C. § 119 to Japanese Patent Application No. 2021-023439, filed on Feb. 17, 2021. The above application is hereby expressly incorporated by reference, in its entirety, into the present application.

BACKGROUND OF THE INVENTION

1. Field of the Invention

The present invention relates to an image processing apparatus, an image processing method, a program, and a recording medium for editing and creating a print product such as a postcard, a photographic print, and a photo book on a server on a cloud.

2. Description of the Related Art

An image processing apparatus of the related art for creating a print product includes a stand-alone type order receiving machine (storefront machine) installed in a store such as a photo shop. The stand-alone type order receiving machine is required to receive a desired print product material and an image to be applied to the print product material from a user and perform image processing on the image which requires a high processing capacity. Thus, as the order receiving machine, an expensive apparatus having a high processing capacity is required, and a large amount of cost is required in a case where a large number of order receiving machines are introduced in a store.

On the other hand, an image processing apparatus including a server that performs image processing which requires a high processing capacity on an image on a cloud and a cloud-type kiosk terminal as the order receiving machine in a store in order to reduce introduction cost of the order receiving machine has been proposed.

In the image processing apparatus of the related art using the cloud-type kiosk terminal, the order receiving machine of the store receives a desired print product material and an image to be applied to the print product material from a user, and transmits (uploads) the print product material and the image from the store to the server on the cloud via a network. On the other hand, in the server, the image is applied to the print product material to create a print product. The print product is received (downloaded) from the server to the store or a print laboratory (print production factory) via the network, and the print product is printed in the store or the print laboratory.

Here, the related arts related to the present invention include, for example, JP2007-193616A, JP2007-194966A, JP2008-502249A, and JP2008-117308A.

JP2007-193616A describes that communication traffic between an album orderer terminal and an album creation apparatus is reduced by automatically selecting a plurality of image candidates used for album creation and transmitting the selected image from the album orderer terminal to the album creation apparatus.

JP2007-194966A describes that communication traffic is reduced by creating an album sample by using a low-quality image, receiving a high-quality image of the image used for album creation, and arranging the image in an album.

JP2008-502249A describes that a first portion of multimedia data to be processed in a mobile phone and a second portion of multimedia data to be processed in a remote server are specified depending on factors affecting a quality of service usage, the first portion is executed in the mobile phone, and the second portion is executed in the remote server.

JP2008-117308A describes that album image data is printed by uploading photographic image data from a mobile phone to a server, converting the album image data into album image data with a layout on the server, and downloading the album image data to the mobile phone.

SUMMARY OF THE INVENTION

However, in the image processing apparatus of the related art using the cloud-type kiosk terminal, since the image is transmitted from the order receiving machine of the store to the server on the cloud, usability in a case where a user performs an ordering operation of a print product changes greatly depending on a bandwidth of a network that connects the order receiving machine of the store and the server on the cloud. In a case where the network bandwidth is insufficient, a transmission time of the image becomes long, and thus, the usability deteriorates. Accordingly, in a case where an operation time when the user performs the ordering operation becomes long, the user may give up the order.

An object of the present invention is to provide an image processing apparatus, an image processing method, a program, and a recording medium capable of comfortably performing an ordering operation of a print product by a user even in a case where a bandwidth of a network is insufficient.

In order to achieve the above object, the present invention provides an image processing apparatus including a first processor, and a second processor. The first processor receives, as inputs, an image and an instruction of image processing to be performed on the images, the second processor performs first image processing corresponding to the instruction of image processing on the images to generate a first image after the image processing based on the image and the instruction of image processing received from the first processor via a global network, and the first processor decides whether or not to transmit the image and the instruction of image processing to the second processor based on a type of the instruction of image processing, and performs control such that the image and the instruction of image processing are transmitted to the second processor in a case where it is decided to transmit the image and the instruction of image processing to the second processor.

Here, it is preferable that the first processor decides to transmit the image and the instruction of image processing to the second processor in a case where the instruction of image processing is an instruction of image processing other than image processing of enlarging, reducing, rotating, or moving the image.

It is preferable that the first processor decides not to transmit the image and the instruction of image processing to the second processor in a case where the instruction of image processing is an instruction of image processing other than image processing of enlarging, reducing, rotating, or moving the image.

It is preferable that the first processor performs second image processing corresponding to the instruction of image processing on the image to generate a second image after the image processing in a case where it is decided not to transmit the image and the instruction of image processing to the second processor.

It is preferable that the first processor receives, as inputs, a plurality of images, and receives, as inputs, one image selected from among at least one image of the plurality of images and an instruction of image processing to be performed on the one image and decides whether or not to transmit the one image and the instruction of image processing to be performed on the one image to the second processor based on a type of the instruction of image processing to be performed on the one image.

It is preferable that the image processing apparatus further includes a printer, the first processor receives, as an input, an instruction to select a print product material, the second processor applies the image to the print product material, and performs the first image processing on the image to generate the first image which becomes a print product, and the first processor controls the printer to print the same image as an image which becomes a print product on which the first image processing is not performed by the second processor from among the images instead of the image which becomes the print product on which the first image processing is not performed by the second processor based on a type of the print product.

It is preferable that the first processor receives, as an input, an instruction to select a print product material to which the image is applied, performs third image processing of reducing a resolution of the image to generate a third image after the resolution is changed based on a minimum required resolution of an image for printing set for each type of the print product material, and performs control such that the third image is transmitted as the image to the second processor.

The present invention provides an image processing method including a step of receiving, by an instruction receiving unit, as inputs, an image and an instruction of image processing to be performed on the image, a step of performing, by a first image processing unit, first image processing corresponding to the instruction of image processing on the image to generate a first image after the image processing based on the image and the instruction of image processing received from the instruction receiving unit via a global network, a step of deciding, by a transmission decision unit, whether or not to transmit the image and the instruction of image processing to the first image processing unit based on a type of the instruction of image processing, and a step of controlling, by a transfer controller, the instruction receiving unit, to transmit the image and the instruction of image processing to the first image processing unit in a case where it is decided to transmit the image and the instruction of image processing to the first image processing unit.

Here, it is preferable that it is decided to transmit the image and the instruction of image processing to the first image processing unit in a case where the instruction of image processing is an instruction of image processing other than image processing of enlarging, reducing, rotating, or moving the image.

It is preferable that it is decided not to transmit the image and the instruction of image processing to the first image processing unit in a case where the instruction of image processing is an instruction of image processing other than image processing of enlarging, reducing, rotating, or moving the image.

It is preferable that the image processing method further includes a step of performing, by a second image processing unit, second image processing corresponding to the instruction of image processing on the image to generate a second image after the image processing based on the image and the instruction of image processing received from the instruction receiving unit and a step of controlling, by the transfer controller, the instruction receiving unit to transmit the image and the instruction of image processing to the second image processing unit in a case where it is decided not to transmit the image and the instruction of image processing to the first image processing unit.

It is preferable that the image processing method further includes a step of receiving, by the instruction receiving unit, as inputs, a plurality of images, and receiving, as inputs, one image selected from among at least one image of the plurality of images and an instruction of image processing to be performed on the one image and a step of deciding, by a transmission decision unit, whether or not to transmit the one image and the instruction of image processing to be performed on the one image to the first image processing unit based on a type of the instruction of image processing to be performed on the one image.

It is preferable that the image processing method further includes a step of receiving, by the instruction receiving unit, as an input, an instruction to select a print product material, a step of applying, by the first image processing unit, the image to the print product material, and performing the first image processing on the image to generate the first image which becomes a print product, and a step of controlling, by a print controller, the printer to print the same image as an image which becomes a print product on which the first image processing is not performed by the first image processing unit from among the images instead of the image which becomes the print product on which the first image processing is not performed by the first image processing unit based on a type of the print product.

It is preferable that the image processing method further includes a step of receiving, by the instruction receiving unit, as an input, an instruction to select a print product material to which the image is applied, a step of performing, by the second image processing, third image processing of reducing a resolution of the image to generate a third image after the resolution is changed based on a minimum required resolution of an image for printing set for each type of the print product material, and a step of controlling, by the transfer controller, the instruction receiving unit to transmit, as the image, the third image to the first image processing unit.

The present invention provides a program causing a computer to execute the steps of the image processing method.

The present invention provides a computer-readable recording medium having recorded thereon a program causing a computer to execute the steps of the image processing method.

In the present invention, it is decided whether or not to transmit the image and the instruction of image processing to the first image processing unit based on the type of the instruction of image processing, the image and the instruction of image processing are transmitted to the first image processing unit only in a case where it is decided to transmit the image and the instruction of image processing to the first image processing unit, and control is performed such that the first image processing unit performs the image processing on the image.

Accordingly, according to the present invention, since the amount of transferred image can be reduced and the amount of bandwidth used in the global network can be reduced, even in a case where the bandwidth of the global network is insufficient, usability is improved, and the user can comfortably perform an ordering operation of the print product.

DESCRIPTION OF THE PREFERRED EMBODIMENTS

Hereinafter, an image processing apparatus, an image processing method, a program, and a recording medium according to an embodiment of the present invention will be described in detail based on preferred embodiments shown in the accompanying drawings.

Figure 1:
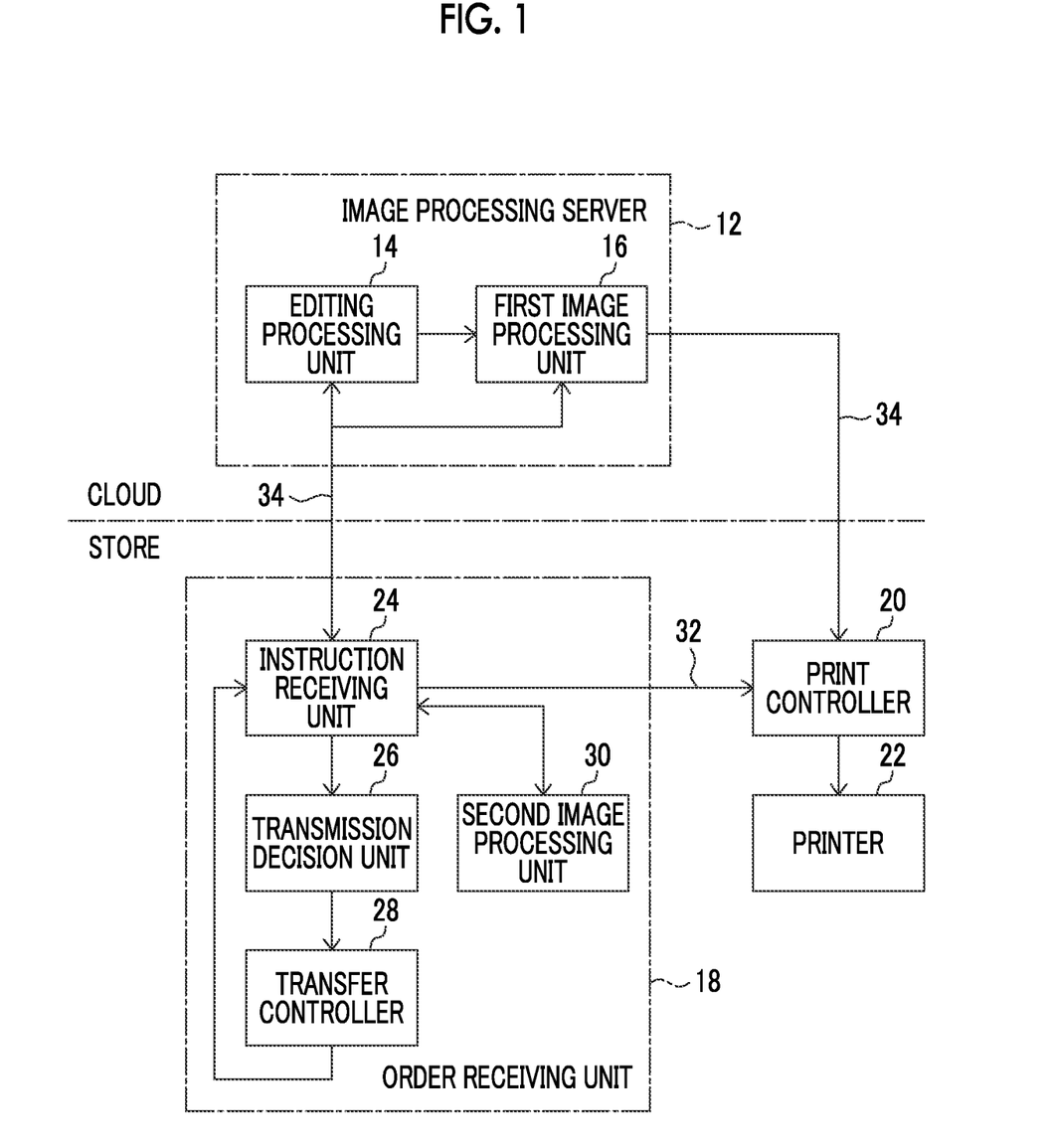
FIG. 1 is a block diagram of an embodiment showing a configuration of an image processing apparatus according to an embodiment of the present invention.

FIG. 1 is a block diagram of an embodiment showing a configuration of an image processing apparatus according to the embodiment of the present invention. An image processing apparatus 10 shown in FIG. 1 is an apparatus using a cloud-type kiosk terminal, and includes an image processing server 12 on a cloud. The image processing server 12 includes an editing processing unit 14 and a first image processing unit 16.

The image processing apparatus 10 includes an order receiving unit 18, a print controller 20, and a printer 22 in a store. The order receiving unit 18 includes an instruction receiving unit 24, a transmission decision unit 26, a transfer controller 28, and a second image processing unit 30.

The order receiving unit 18 of the store, that is, the instruction receiving unit 24, the transmission decision unit 26, the transfer controller 28, the second image processing unit 30, and the print controller 20 are examples of a first processor according to the embodiment of the present invention. The editing processing unit 14 and the first image processing unit 16 on the cloud are examples of a second processor according to the embodiment of the present invention.

In the store, the transmission decision unit 26 and the transfer controller 28 are sequentially connected to the instruction receiving unit 24, and the instruction receiving unit 24 is connected to the transfer controller 28. The instruction receiving unit 24 is connected to the second image processing unit 30, and is further connected to the print controller 20 via a local network 32 in the store. The print controller 20 is connected to the printer 22. The instruction receiving unit 24 is connected to the editing processing unit 14 and the first image processing unit 16 on the cloud via a global network 34 such as the Internet and a telephone line.

On the cloud, the editing processing unit 14 is connected to the first image processing unit 16, and the first image processing unit 16 is connected to the print controller 20 of the store via the global network 34.

In the store, the order receiving unit 18 is the cloud-type kiosk terminal and receives an order for a print product from a user. The order receiving unit 18 is an inexpensive personal computer or the like which has a lower processing capacity than the image processing server 12 on the cloud.

In the order receiving unit 18, the instruction receiving unit 24 receives various instructions related to the orders of the print products from the user on an user interface (UI) screen for performing an editing work displayed on a screen of a web browser operating on the instruction receiving unit 24.

The instruction receiving unit 24 receives, as inputs, for example, an instruction to select a print product material, an instruction to select an image or the like to be applied to the print product material, an instruction of image processing to be performed to the image, or the like from the user.

The print product material represents a type of a product material for creating various print products such as a photographic print, a calender containing photos, and a photo book (photo album).

The instruction of image processing is not particularly limited, but includes, for example, various kinds of image processing such as processing of applying a filter to an image, processing of synthesizing a stamp on an image, processing of trimming an image, and synthesis processing of synthesizing a plurality of images in addition to enlarging, reducing, rotating, and moving an image.

The transmission decision unit 26 similarly decides whether or not to transmit the image and the instruction of image processing received by the instruction receiving unit 24 to the first image processing unit 16 on the cloud based on a type of the instruction of image processing received by the instruction receiving unit 24.

In a case where the instruction of image processing is an instruction of image processing that requires a high processing capacity, for example, in a case where the instruction of image processing is an instruction of image processing other than image processing of enlarging, reducing, rotating, and moving an image, the transmission decision unit 26 decides to transmit the image and the instruction of image processing to the first image processing unit 16.

On the other hand, in a case where the instruction of image processing is an instruction of image processing that does not require a high processing capacity, for example, in a case where the instruction of image processing is an instruction of image processing of enlarging, reducing, rotating, and moving an image, the transmission decision unit 26 decides not to transmit the image and the instruction of image processing to the first image processing unit 16.

In a case where the transmission decision unit 26 decides to transmit the image and the instruction of image processing to the first image processing unit 16, the transfer controller 28 controls the instruction receiving unit 24 to transmit the image and the instruction of image processing to the first image processing unit 16.

On the other hand, in a case where the transmission decision unit decides not to transmit the image and the instruction of image processing to the first image processing unit 16, the transfer controller 28 controls the instruction receiving unit 24 to transmit the image and the instruction of image processing to the second image processing unit 30.

The second image processing unit 30 applies second image processing corresponding to the instruction of image processing on the image to generate a second image after the image processing based on the image and the instruction of image processing received from the instruction receiving unit 24. That is, in a case where the instruction of image processing is the instruction of image processing of enlarging, reducing, rotating, or moving an image, the second image processing unit 30 generates the second image.

The print controller 20 controls printing by the printer 22.

The print controller 20 controls, for example, the printer 22 to print the first image after the image processing, which becomes the print product received from the first image processing unit 16. The print controller 20 can also control the printer to print, as the print product, the second image generated by the second image processing unit 30 or the image (local image) received by the instruction receiving unit 24.

The printer 22 prints each of the local image, the first image after the image processing, and the second image after the image processing under the control of the print controller 20.

On the cloud, the image processing server 12 performs various kinds of image processing on the image to create a final print product based on an instruction from the user. The image processing server 12 has a higher processing capacity than the order receiving unit 18 of the store, and is an expensive personal computer, workstation, or the like.

In the image processing server 12, the editing processing unit 14 provides a UI screen for the user to perform an editing work on the print product on the screen of the web browser operating on the instruction receiving unit 24. This UI screen is a UI screen for the user to select a desired print product material from among a plurality of print product materials, a UI screen for selecting an image to be applied to this print product material, a UI screen for displaying an image or a list of images, a UI screen for selecting image processing to be performed to an image, and the like.

The first image processing unit 16 performs image processing corresponding to the editing work on the image based on the editing work by the user.

The first image processing unit 16 performs the first image processing corresponding to the instruction of image processing on the image to generate the first image after the image processing based on the image and the instruction of image processing received from the instruction receiving unit 24 of the store. That is, in a case where the instruction of image processing is the instruction of image processing other than the image processing of enlarging, reducing, rotating, or moving an image, the first image processing unit 16 generates the first image after the image processing.

The editing processing unit 14 and the first image processing unit 16 are realized by, for example, a web application operating on a web browser.

Figure 2:
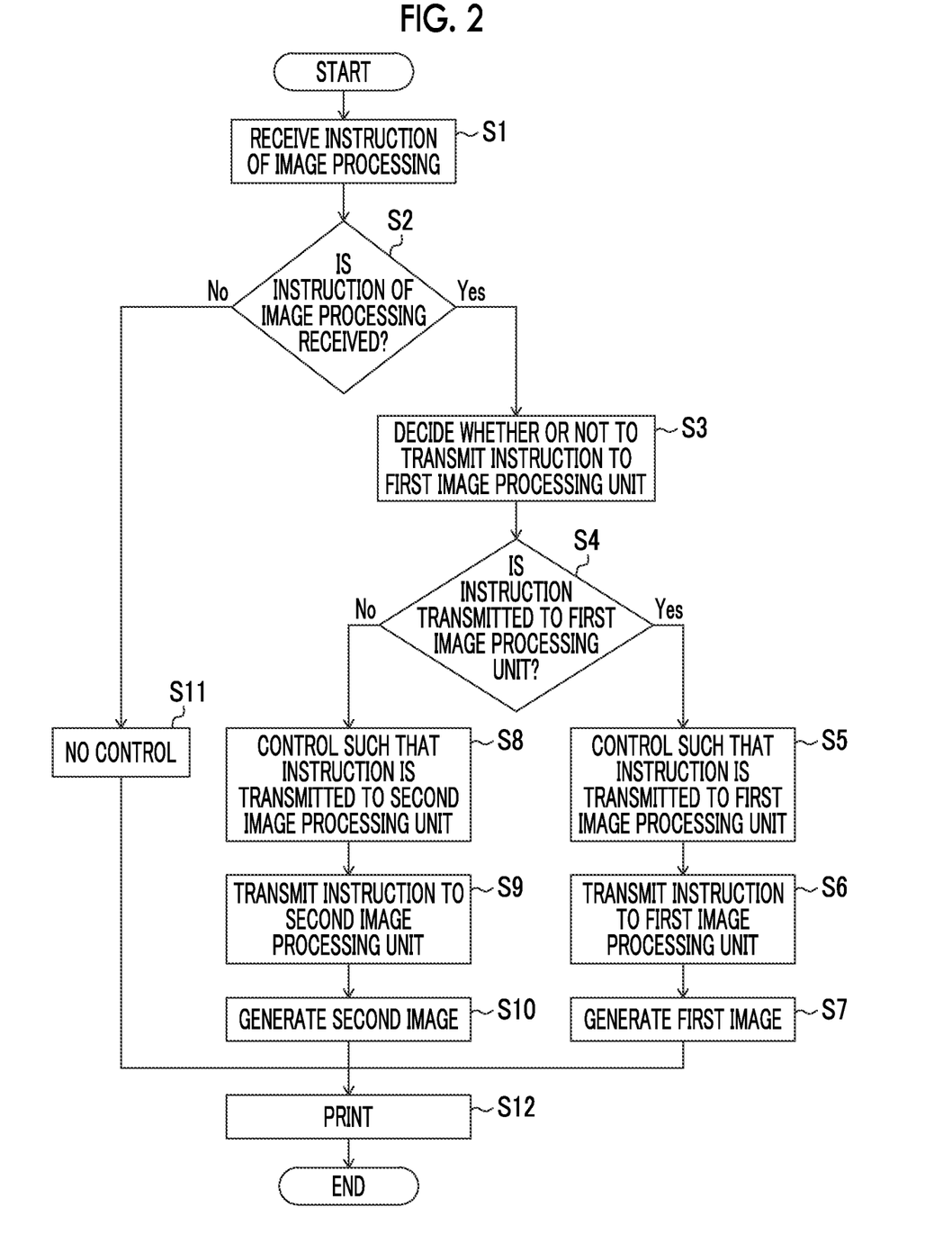
FIG. 2 is a flowchart of an embodiment showing an operation of the image processing apparatus.

Next, an operation of the image processing apparatus 10 will be described with reference to a flowchart shown in FIG. 2.

First, in the store, the order receiving unit 18 receives the order of the print product from the user.

The user performs the editing work of the desired print product on the UI screen for performing the editing work displayed on the screen of the web browser operating on the instruction receiving unit 24. For example, the user selects a desired print product material and a size of the print product material from among the plurality of print product materials, selects an image to be applied to the print product material from among images stored in a recording medium such as a secure digital (SD) card owned by the user, and performs the editing work of applying the selected image to the print product material or performing various kinds of image processing on the image.

Accordingly, the instruction receiving unit 24 receives, for example, inputs such as an instruction to select the print product material, an instruction to select the image to be applied to the print product material, and an instruction of image processing to be performed on the image from the user (step S1).

In a case where the instruction receiving unit 24 receives the image and the instruction of image processing to be applied to the image from the user (Yes in step S2), the transmission decision unit 26 decides whether or not to transmit the image and the instruction of image processing received by the instruction receiving unit 24 to the first image processing unit 16 on the cloud based on the type of the instruction of image processing (step S3).

As a result, in a case where the transmission decision unit 26 decides to transmit the image and the instruction of image processing to the first image processing unit 16 (Yes in step S4), the transfer controller 28 controls the instruction receiving unit 24 to transmit the image and the instruction of image processing to the first image processing unit 16 (step S5).

Accordingly, the instruction receiving unit 24 transmits the image and the instruction of image processing to the first image processing unit 16 via the global network 34 (step S6).

Subsequently, the first image processing unit 16 performs the first image processing corresponding to the instruction of image processing on the image to generate the first image after the image processing based on the image and the instruction of image processing received from the instruction receiving unit 24 of the store (step S7). Since the image processing server 12 has a high processing capacity, the first image processing unit 16 can perform the first image processing that requires a high processing capacity on the image.

The first image processing unit 16 transmits the first image after the image processing to the instruction receiving unit 24 of the store via the global network 34, or transmits the first image after the image processing to the print controller 20 of the store. Alternatively, the first image processing unit 16 can also transmit the first image after the image processing to a print laboratory via the global network 34.

On the other hand, in a case where the transmission decision unit decides not to transmit the image and the instruction of image processing to the first image processing unit 16 (No in step S4), the transfer controller 28 controls the instruction receiving unit 24 to transmit the image and the instruction of image processing to the second image processing unit 30 (step S8).

Accordingly, the instruction receiving unit 24 transmits the image and the instruction of image processing to the second image processing unit 30 (step S9).

Subsequently, the second image processing unit 30 performs the second image processing corresponding to the instruction of image processing on the image to generate the second image after the image processing based on the image and the instruction of image processing received from the instruction receiving unit 24 (step S10). The order receiving unit 18 has a low processing capacity, but the second image processing unit 30 can perform the second image processing which does not require a high processing capacity on the image.

The second image processing unit 30 transmits the second image after the image processing to the instruction receiving unit 24.

In a case where the instruction receiving unit 24 does not receive the instruction of image processing to be performed on the image from the user, that is, in a case where there is no instruction of image processing (No in step S2), the transfer controller 28 does not control the instruction receiving unit 24 (step S11). In this case, the image processing is not performed on the image.

The user can browse the image received by the instruction receiving unit 24, the first image after the image processing received from the first image processing unit 16, and the second image after the image processing received from the second image processing unit 30 on the screen of the web browser operating on the instruction receiving unit 24. The user can complete the final print product by further performing the editing work on the image, and then order the print product.

In a case where the print product is ordered, for example, the first image after the image processing, which becomes the print product received from the first image processing unit 16, is printed by the printer 22 under the control of the print controller 20 (step S12). Alternatively, the print controller 20 can also control the printer to print, as the print product, the second image generated by the second image processing unit 30 or the image (local image) received by the instruction receiving unit 24.

As stated above, in the image processing apparatus 10, control is performed such that the transmission decision unit decides whether or not to transmit the image and the instruction of image processing to the first image processing unit 16 based on the type of the instruction of image processing, and transmits the image and the instruction of image processing to the first image processing unit only in a case where the transmission decision unit decides to transmit the image and the instruction of image processing to the first image processing unit 16, that is, only in the case of the image processing which requires a high processing capacity, and the first image processing unit 16 on the cloud performs the image processing on the image.

Accordingly, in the image processing apparatus 10, since the amount of transferred image can be reduced and the amount of bandwidth used by the global network 34 can be reduced, even in a case where the bandwidth of the global network 34 is insufficient, usability can be improved, and the user can comfortably perform an ordering operation of the print product.

Next, a specific example of the image processing apparatus according to the embodiment of the present invention will be described.

First, a first specific example will be described.

Figure 3:
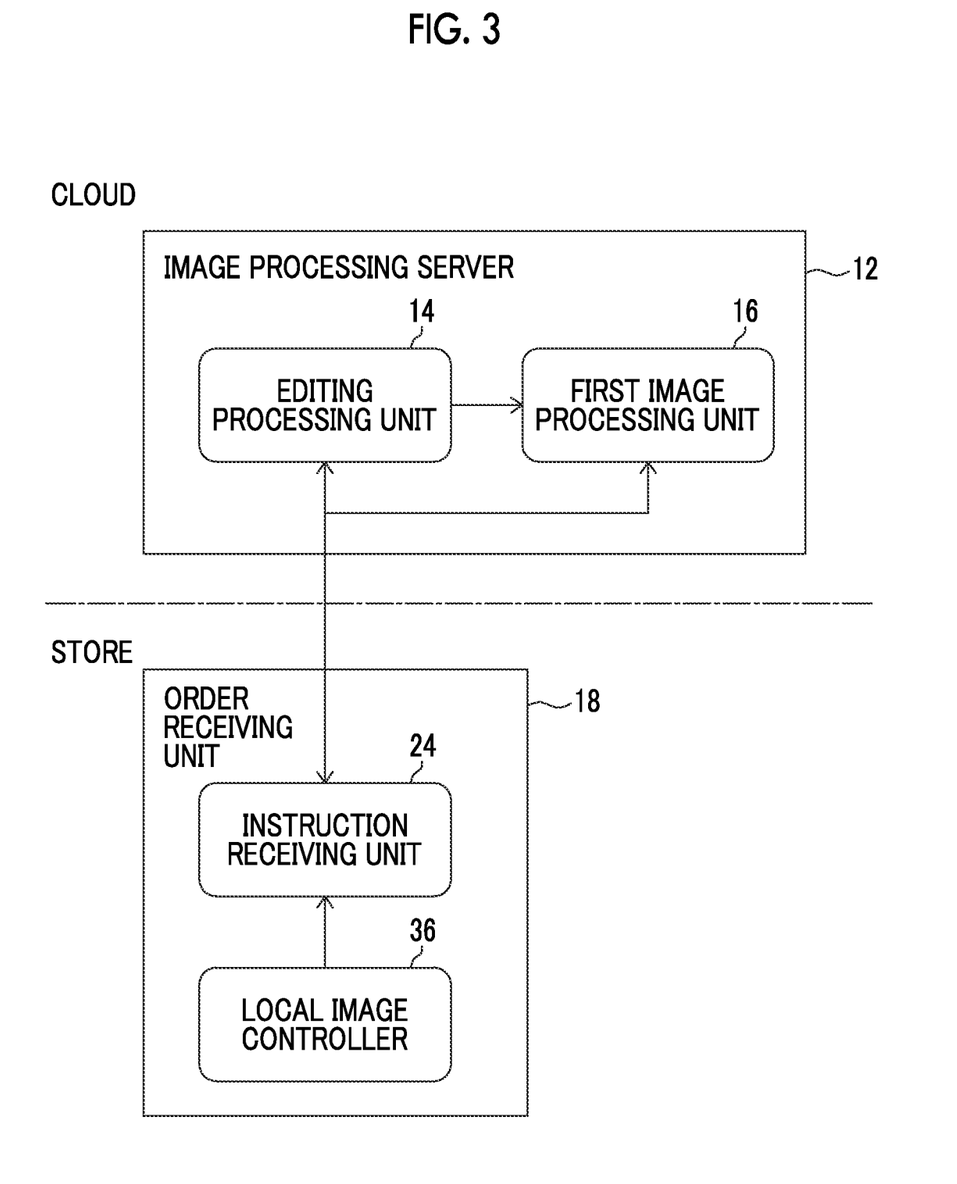
FIG. 3 is a block diagram of a first specific example showing the configuration of the image processing apparatus according to the embodiment of the present invention.

FIG. 3 is a block diagram of the first specific example showing a configuration of the image processing apparatus according to the embodiment of the present invention. Although the image processing apparatus shown in FIG. 3 is not shown, the order receiving unit 18 of the image processing apparatus 10 shown in FIG. 1 further includes a local image controller 36. That is, in the image processing apparatus shown in FIG. 3, only the instruction receiving unit 24 and the local image controller 36 are shown in the store, the editing processing unit 14 and the first image processing unit 16 are shown on the cloud, and the illustration of the other components is omitted.

The local image controller 36 performs control such that the image (local image) received by the instruction receiving unit 24 is displayed on the UI screen of the list of images displayed on the screen of the web browser operating on the instruction receiving unit 24.

Figure 4:
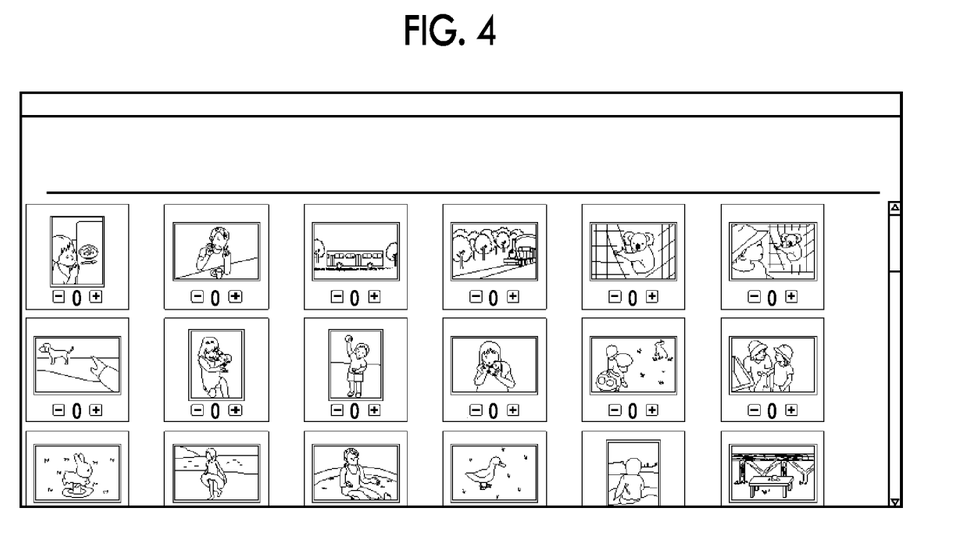
FIG. 4 is a conceptual diagram of an embodiment showing a screen of a web browser on which a list of images is displayed.

In a case where the user selects the image to be applied to the print product material from among the images stored in the recording medium such as the SD card, a list of images (thumbnail images) is displayed on the UI screen of the list of images as shown in FIG. 4.

In an image processing apparatus of the related art using the cloud-type kiosk terminal, since the image processing is performed on the images by a server on the cloud, all the images stored in the recording medium are normally transmitted from the cloud-type kiosk terminal to the server on the cloud, all the images are received from the server on the cloud to the cloud-type kiosk terminal of the store, and the list of the received images is displayed on the UI screen of the list of images displayed on the screen of the web browser operating on the cloud-type kiosk terminal. Accordingly, as the number of images increases, a transfer time of the images becomes longer, and a time until the list of images is displayed becomes longer.

On the other hand, in the image processing apparatus shown in FIG. 3, in a case where the list of images is displayed, the list of images (local images) is displayed under the control of the local image controller 36 without transmitting and receiving the images between the instruction receiving unit 24 and the server on the cloud.

In this case, the user tries to display the list of images stored in the recording medium on the UI screen of the list of images.

Accordingly, the instruction receiving unit 24 receives, as inputs, a plurality of images stored in the recording medium.

Subsequently, the instruction receiving unit 24 displays the UI screen of the list of images received from the editing processing unit 14 on the screen of the web browser. Immediately before a timing of moment, the list of images is not displayed on the UI screen of the list of images.

Subsequently, the local image controller 36 performs control such that the list of local images is displayed on the UI screen of the list of images.

Although not particularly limited, for example, the local image controller 36 encodes the local image by an encoding scheme such as a base64 scheme to create an encoded image, or acquires a file path of the local image. In a source code of the UI screen of the list of images, for example, in an image (img) tag of the document object model (DOM), the list of local images can be displayed by embedding the encoded image as each image included in the list of images or replacing the file path with the file path of the local image.

Accordingly, since the list of local images can be displayed without transferring the images between the instruction receiving unit 24 and the first image processing unit 16 of the image processing server 12 on the cloud, the list of images can be displayed at a high speed.

Subsequently, the user selects, for example, one image from the list of images displayed on the UI screen of the list of images, and selects the image processing to be performed on the one image.

Accordingly, the order receiving unit 18 receives, as inputs, one image selected by the user from among a plurality of images included in the list of images and an instruction of image processing to be performed on the one image.

In a case where the instruction of image processing is the instruction of image processing that requires a high processing capacity, as described above, the first image processing unit 16 performs the first image processing corresponding to the instruction of image processing on one image to generate the first image after the image processing.

For example, in a case where the instruction of image processing is processing of synthesizing a heart-shaped stamp on an image on an upper right side shown in FIG. 4, the first image processing unit 16 performs the processing of synthesizing the heart-shaped stamp on the image on the upper right side to generate the first image after the image processing.

Figure 5:
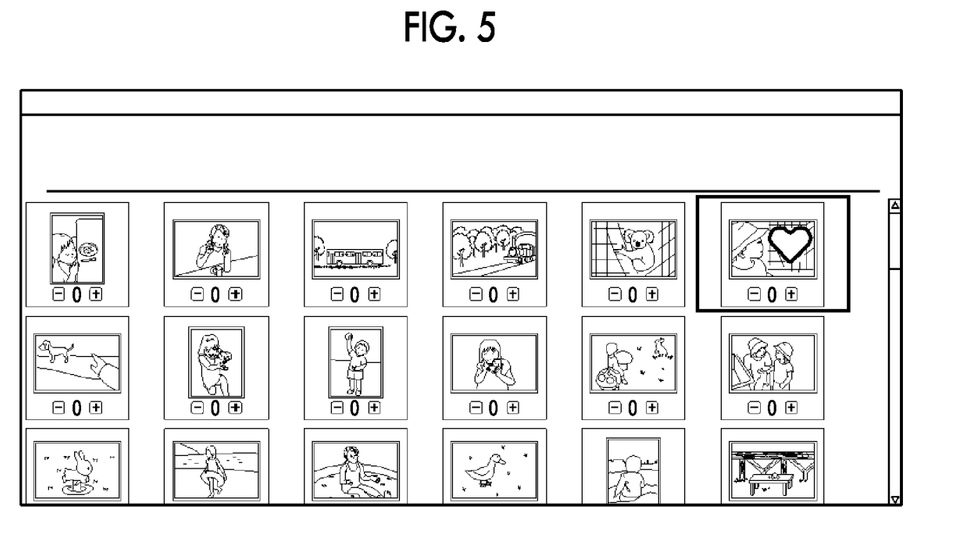
FIG. 5 is a conceptual diagram of an embodiment showing a screen of a web browser in which a first image after image processing by a first image processing unit is displayed in the list of images shown in FIG. 4.

As a result, in the list of images displayed on the UI screen of the list of images, the first image after the image processing in which the heart-shaped stamp is synthesized is displayed as shown by enclosing an image on an upper right side of FIG. 5 with a frame. That is, in the list of images, the local image and the first image after the image processing are displayed together.

On the other hand, in a case where the instruction of image processing is the instruction of image processing that does not require a high processing capacity, the second image processing unit 30 performs the second image processing corresponding to the instruction of image processing to generate the second image after the image processing.

As a result, the second image after the image processing is displayed in the list of images displayed on the UI screen of the list of images. That is, in the list of images, the local image and the second image after the image processing are displayed together.

Accordingly, since the amount of transmitted images (amount of upload images) can be reduced and the amount of bandwidth used by the global network 34 can be reduced, even in a case where the bandwidth of the global network 34 is insufficient, usability can be improved, and the user can comfortably perform the ordering operation of the print product. The instruction receiving unit 24 can display the local image, the first image after the image processing, and the second image.

Although the case where the list of images is displayed has been described as an example, the present invention is not limited thereto, and the same applies to a case where at least one of the plurality of images is displayed and the image processing is performed on one image selected by the user.

Next, a second specific example will be described.

Figure 6:
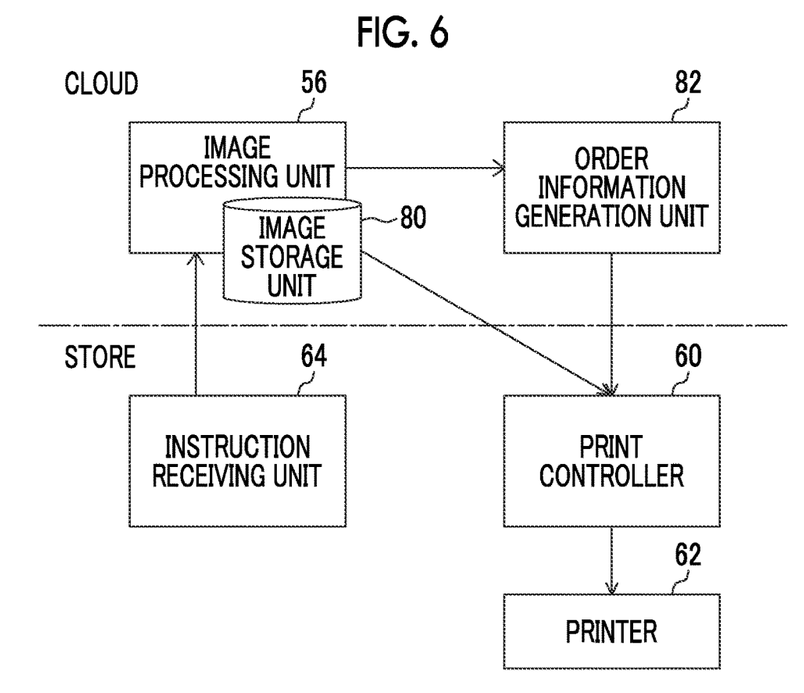
FIG. 6 is a block diagram showing an example of a configuration of an image processing apparatus of the related art using a cloud-type kiosk terminal.

FIG. 6 is a block diagram of an example showing a configuration of the image processing apparatus of the related art using the cloud-type kiosk terminal. The image processing apparatus shown in FIG. 6 includes an image processing unit 56, an image storage unit 80, and an order information generation unit 82 on the cloud, and includes an instruction receiving unit 64, a print controller 60, and a printer 62 in the store.

In the image processing apparatus shown in FIG. 6, in a case where a print product is ordered, the user selects a desired print product material or the like from among a plurality of print product materials, and selects an image to be applied to the print product material from among images stored in a recording medium.

Accordingly, the instruction receiving unit 64 receives, as inputs, the print product material and the image to be applied to the print product material from the user, and transmits the print product material and the image to the image processing unit 56 on the cloud. This image is stored in the image storage unit 80 under the control of the image processing unit 56.

Subsequently, the user completes the editing work of the final print product to which the image is applied to the print product material by performing various editing works, and then confirms the order of the print product.

Accordingly, the image processing unit 56 applies the image to the print product material based on the editing work by the user, and performs the image processing corresponding to the editing work on the image to generate the image after the image processing which becomes the print product. The image after the image processing which becomes the print product is stored in the image storage unit 80 under the control of the image processing unit 56.

For example, the image processing unit 56 may not perform the image processing depending on the type of the print product such as the photographic print. Such a print product is stored in the image storage unit 80 on the cloud as it is received from the instruction receiving unit 64 of the store.

Subsequently, the order information generation unit 82 generates order information including information on a storage location of the print product stored in the image storage unit 80 by the image processing unit 56, and transmits this order information to the print controller 60 of the store.

The information on the storage location is not particularly limited, and for example, the storage location of the print product can be designated by a uniform resource locator (URL).

Subsequently, the print controller 60 receives (downloads) the print product from the storage location of the print product included in the order information. That is, the print controller 60 receives the print product on which image processing is performed by the image processing unit 56 from the image storage unit 80 on the cloud. The print controller 60 causes the printer 62 to print the print product.

As described above, in the image processing apparatus of the related art, all the print products are received from the image storage unit 80 on the cloud to the print controller 60 of the store and are printed.

Figure 7:
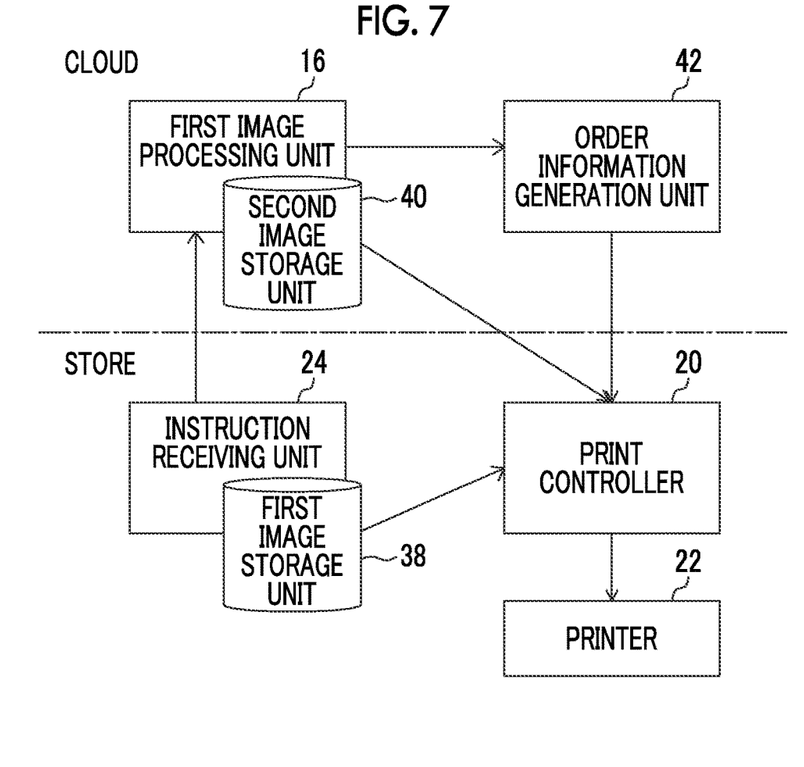
FIG. 7 is a block diagram of a second specific example showing the configuration of the image processing apparatus according to the embodiment of the present invention.

FIG. 7 is a block diagram of the second specific example showing the configuration of the image processing apparatus according to the embodiment of the present invention. Although the image processing apparatus shown in FIG. 7 is not shown, the order receiving unit 18 of the image processing apparatus shown in FIG. 1 further includes a first image storage unit 38, and the image processing server 12 further includes a second image storage unit 40 and an order information generation unit 42. That is, in the image processing apparatus shown in FIG. 7, only the instruction receiving unit 24, the first image storage unit 38, the print controller 20, and the printer 22 are shown in the store, only the first image processing unit 16, the second image storage unit 40, and the order information generation unit 42 are shown on the cloud, and the illustration of the other components is omitted.

The first image storage unit 38 stores the image (local image) received by the instruction receiving unit 24 under the control of the instruction receiving unit 24.

Under the control of the first image processing unit 16, the second image storage unit 40 stores the image received from the instruction receiving unit 24 and the first image after the image processing which becomes the print product.

The order information generation unit 42 generates order information based on an instruction of order confirmation received from the instruction receiving unit 24. The order information includes, for example, information such as a name of the ordered print product, the number of prints, and the storage location of the print product.

The order information generation unit 42 is realized by a web application.

In the image processing apparatus shown in FIG. 7, in a case where the print product is ordered, the user selects a desired print product material or the like from among the plurality of print product materials on the UI screen for performing the editing work displayed on the screen of the web browser operating on the instruction receiving unit 24 of the store, and selects an image to be applied to the print product material from among the images stored in the recording medium.

Accordingly, the instruction receiving unit 24 receives, as the inputs, the print product material and the image to be applied to the print product material from the user. This image is stored in the first image storage unit 38 under the control of the instruction receiving unit 24.

Subsequently, the instruction receiving unit 24 transmits the image to be applied to the print product material to the first image processing unit 16 on the cloud. This image is stored in the second image storage unit 40 under the control of the first image processing unit 16.

Subsequently, the user completes the editing work of the final print product to which the image is applied to the print product material by performing various editing works, and then confirms the order of the print product.

Accordingly, the first image processing unit 16 applies the image to the print product material based on the editing work by the user, and performs the first image processing corresponding to the editing work on the image to generate the first image after the image processing which becomes the print product. The first image after the image processing which becomes the print product is stored in the second image storage unit 40 under the control of the first image processing unit 16.

As described above, the print product on which the image processing is not performed by the first image processing unit 16 is stored in the second image storage unit 40 on the cloud as it is received from the instruction receiving unit 24 of the store.

Subsequently, the order information generation unit 42 generates order information including information on the storage location of the print product stored in the second image storage unit 40 by the first image processing unit 16, and transmits the order information to the print controller 20 of the store.

The print controller 20 controls the printer 22 to print the same local image as the image which becomes the print product from among local images stored in the first image storage unit 38 of the store instead of the image which becomes the print product on which the image processing that requires a high processing capacity is not performed, in other words, the print product on which the first image processing is not performed by the first image processing unit 16 based on the type of the print product (print product material) included in the order information, for example, such as the photographic print.

Although not particularly limited, for example, in a case where the local image stored in the first image storage unit 38 of the store is printed instead of the image which becomes the print product stored in the second image storage unit 40 on the cloud, the print controller 20 replaces, as the storage location of the print product, the storage location of the image which becomes the print product stored in the second image storage unit 40 on the cloud with the storage location of the local image stored in the first image storage unit 38 of the store which is the same image as the print product in the order information.

Subsequently, the print controller 20 receives (downloads) the print product from the storage location of the print product included in the order information. That is, the print controller 20 receives the first image which becomes the print product on which the first image processing is performed by the first image processing unit 16 from the second image storage unit 40 on the cloud, and receives the image which becomes the print product on which the first image processing is not performed by the first image processing unit 16, that is, the local image that is the same image as the image of the print product from the first image storage unit 38 of the store. The print controller 20 causes the printer 22 to print the print product.

As described above, in the image processing apparatus of the second specific example, the print product on which the first image processing is not performed by the first image processing unit 16 is received from not the second image storage unit 40 on the cloud but the first image storage unit 38 of the store and is printed. Accordingly, since the amount of received (downloaded) images can be reduced and the amount of bandwidth used by the global network 34 can be reduced, even in a case where the bandwidth of the global network 34 is insufficient, usability can be improved, and the user can comfortably perform the ordering operation of the print product.

Next, a third specific example will be described.

Figure 8:
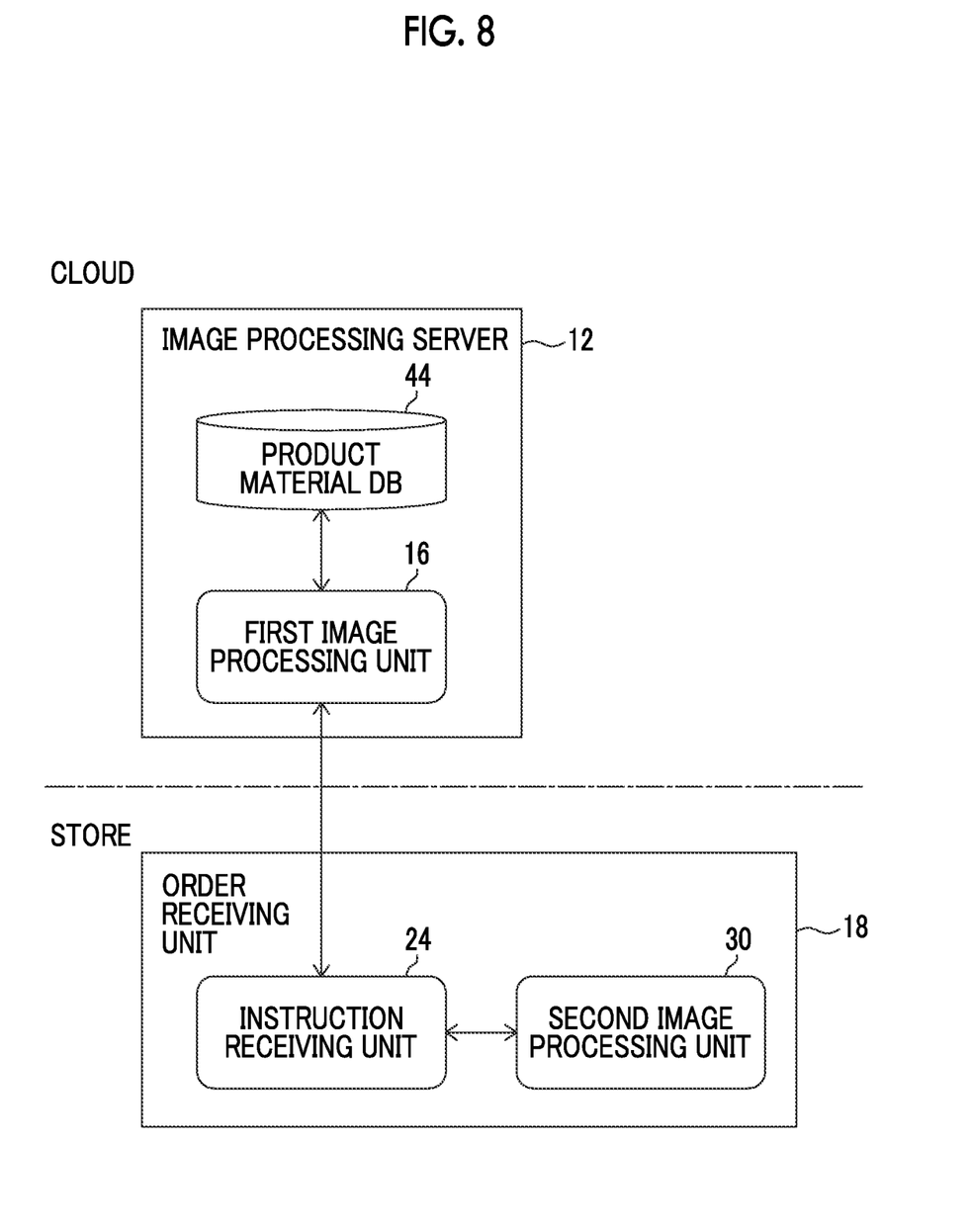
FIG. 8 is a block diagram of a third specific example showing the configuration of the image processing apparatus according to the embodiment of the present invention.

FIG. 8 is a block diagram of a third specific example showing the configuration of the image processing apparatus according to the embodiment of the present invention. Although the image processing apparatus shown in FIG. 8 is not shown, the image processing server 12 of the image processing apparatus shown in FIG. 1 further includes a product material database (DB) 44. That is, in the image processing apparatus shown in FIG. 8, only the instruction receiving unit 24 and the second image processing unit 30 are shown in the store, only the first image processing unit 16 and the product material DB 44 are shown on the cloud, and the Illustration of the other components is omitted.

The product material DB 44 stores various kinds of information related to the print product material, including the type of the print product material and a minimum required resolution of the image for printing set for each type of the print product material.

A resolution of an image captured by a camera of a smartphone or a digital camera is, for example, about 3000×4000 pixels, and a data capacity thereof is about 5 MB to 10 MB.

On the other hand, for example, in the case of a L-sized photographic print, the minimum required resolution of the image for printing is 1050×1500 pixels, and in the case of 2 L-sized photographic print, the minimum required resolution is 1500×2130 pixels.

Accordingly, the image is reduced to a resolution that is equal to or higher than the minimum required resolution of the image for printing set according to the type of the print product material and is smaller than the resolution of the image received by the instruction receiving unit 24, and the image with the reduced resolution can be transmitted.

In this case, the user selects the print product material to which the image is applied from among the plurality of print product materials on the UI screen for performing the editing work displayed on the screen of the web browser operating on the instruction receiving unit 24 of the store.

Accordingly, the instruction receiving unit 24 receives, as the input, the instruction for selecting the print product material from the user.

Subsequently, the first image processing unit 16 acquires the minimum required resolution of the image for printing set for the print product material from the product material DB 44 based on the type of the print product material received from the instruction receiving unit 24.

Subsequently, the instruction receiving unit 24 receives the minimum required resolution of the image for printing from the first image processing unit 16.

Subsequently, the second image processing unit 30 performs third image processing of reducing the resolution of the image to generate a third image after the resolution is changed based on the minimum required resolution of the image for printing received by the instruction receiving unit 24.

In other words, the second image processing unit 30 reduces the resolution of the image such that the resolution is changed to a resolution equal to or higher than the minimum required resolution of the image for printing set for the print product material received by the instruction receiving unit 24 and smaller than the resolution of the image received by the instruction receiving unit 24 based on the minimum required resolution of the image for printing set for each type of print product material.

Subsequently, the transfer controller 28 controls the instruction receiving unit 24 to transmit, as the image, the third image to the first image processing unit.

The instruction receiving unit 24 transmits the third image of which the resolution is reduced to the first image processing unit 16 on the cloud.

In the case of the print product material such as a photo book in which a plurality of images are included in one page (one frame), for example, the minimum required resolution of the image for printing can be acquired for each page, and the resolution of each image included in each page can be reduced and transmitted based on the minimum required resolution of the image for printing of each page.

Accordingly, since the data capacity of the image is reduced and the amount of bandwidth used by the global network 34 can be reduced, even in a case where the bandwidth of the global network 34 is insufficient, usability can be improved, and the user can comfortably perform the ordering operation of the print product.

In the apparatus according to the embodiment of the present invention, for example, a hardware configuration of a processing unit that executes various tasks of processing of the editing processing unit 14, the first image processing unit 16, the print controller 20, the instruction receiving unit 24, the transmission decision unit 26, the transfer controller 28, the second image processing unit 30, the local image controller 36, the order information generation unit 42, and the like may be dedicated hardware, or may be various processors or computers that execute programs. The first image storage unit 38, the second image storage unit 40, the product material DB 44, and the like are memories such as a semiconductor memory, a hard disk drive (HD), and a solid state drive (SSD).

Various processors include a central processing unit (CPU) which is a general purpose processor functioning as various processing units by executing software (program), a programmable logic device (PLD) which is a processor capable of changing a circuit configuration after a field programmable gate array (FPGA) is manufactured, and a dedicated electric circuit which is a processor having a circuit configuration designed as a dedicated circuit in order to perform specific processing such as application specific integrated circuit (ASIC).

One processing unit may be constituted by one of the various processors. One processing unit may be obtained by combining the same kind or different kinds of two or more processors, for example, by combining a plurality of FPGAs, or may be obtained by combining the FPGA and the CPU. The plurality of processing units may be constituted by one of the various processors or may be constituted by using one processor obtained by combining two or more of the plurality of processing units.

For example, one processor is constituted by combining one or more CPUs and software so as to be represented by the computers such as the server and the client, and this processor functions as the plurality of processing units. A processor that realizes the functions of the entire system including the plurality of processing units by using one integrated circuit (IC) chip is used so as to be represented by a system on chip (SoC).

More specifically, the hardware configuration of the various processors is an electric circuitry obtained by combining circuit elements such as semiconductor elements.

For example, a method according to the embodiment of the present invention can be implemented by a program causing a computer to execute steps. It is possible to provide a computer-readable recording medium having the program recorded thereon.

While the present invention has been described in detail, the present invention is not limited to the embodiment, and may be modified and change in various manners without departing the gist of the present invention.

EXPLANATION OF REFERENCES

10: image processing apparatus
12: image processing server
14: editing processing unit
16: first image processing unit
18: order receiving unit
20, 60: print controller
22, 62: printer
24, 64: instruction receiving unit
26: transmission decision unit
28: transfer controller
30: second image processing unit
32: local network
34: global network
36: local image controller
38: first image storage unit
40: second image storage unit
42, 82: order information generation unit
44: product material DB
56: image processing unit
80: image storage unit

What is claimed is:

1. An image processing apparatus, comprising:
a first processor; and
a second processor,
wherein the first processor receives, as inputs, an image, an instruction to select a print product material to which the image is applied, and an instruction of image processing to be performed on the image,
performs third image processing of reducing a resolution of the image to generate a third image after the resolution is changed based on a minimum required resolution of an image for printing set for each type of the print product material, decides whether or not to transmit the third image and the instruction of image processing to the second processor based on a type of the instruction of image processing, and performs control such that only the third image as the image and the instruction of image processing are transmitted to the second processor in a case where it is decided to transmit the third image and the instruction of image processing to the second processor, and wherein the second processor performs first image processing corresponding to the instruction of image processing on the third image to generate a first image after the image processing based on the third image and the instruction of image processing received from the first processor via a global network.

2. The image processing apparatus according to claim 1, wherein the first processor decides to transmit the third image and the instruction of image processing to the second processor in a case where the instruction of image processing is an instruction of image processing other than image processing of enlarging, reducing, rotating, or moving the image.

3. The image processing apparatus according to claim 1, wherein the first processor decides not to transmit the third image and the instruction of image processing to the second processor in a case where the instruction of image processing is an instruction of image processing other than image processing of enlarging, reducing, rotating, or moving the image.

4. The image processing apparatus according to claim 3, wherein the first processor performs second image processing corresponding to the instruction of image processing on the image to generate a second image after the image processing in a case where it is decided not to transmit the third image and the instruction of image processing to the second processor.

5. The image processing apparatus according to claim 4, wherein the first processor receives, as inputs, a plurality of images, and receives, as inputs, one image selected from among at least one image of the plurality of images an instruction to select a print product material to which the one image is applied and an instruction of image processing to be performed on the one image, performs the third image processing on the one image to generate the third image from the one image, and decides whether or not to transmit the third image generated from the one image and the instruction of image processing to be performed on the one image to the second processor based on a type of the instruction of image processing to be performed on the one image.

6. The image processing apparatus according to claim 5, further comprising:

a printer, wherein the second processor applies the third image to the print product material, and performs the first image processing on the third image to generate the first image which becomes a print product, and the first processor controls the printer to print the same image as an image which becomes a print product on which the first image processing is not performed by the second processor from among a plurality of images instead of the image which becomes the print product on which the first image processing is not performed by the second processor based on a type of the print product.

7. The image processing apparatus according to claim 4, further comprising:

a printer, wherein the second processor applies the third image to the print product material, and performs the first image processing on the third image to generate the first image which becomes a print product, and the first processor controls the printer to print the same image as an image which becomes a print product on which the first image processing is not performed by the second processor from among a plurality of images instead of the image which becomes the print product on which the first image processing is not performed by the second processor based on a type of the print product.

8. An image processing method comprising:

a step of receiving, by an instruction receiving unit, as inputs, an image, an instruction to select a print product material to which the image is applied, and an instruction of image processing to be performed on the image;

a step of performing, by a second image processing unit, third image processing of reducing a resolution of the image to generate a third image after the resolution is changed based on a minimum required resolution of an image for printing set for each type of the print product material;

a step of deciding, by a transmission decision unit, whether or not to transmit the third image and the instruction of image processing to a first image processing unit based on a type of the instruction of image processing;

a step of controlling, by a transfer controller, the instruction receiving unit, to transmit only the third image as the image and the instruction of image processing to the first image processing unit in a case where it is decided to transmit the third image and the instruction of image processing to the first image processing unit, and a step of performing, by the first image processing unit, first image processing corresponding to the instruction of image processing on the third image to generate a first image after the image processing based on the third image and the instruction of image processing received from the instruction receiving unit via a global network.

9. The image processing method according to claim 8, wherein it is decided to transmit the third image and the instruction of image processing to the first image processing unit in a case where the instruction of image processing is an instruction of image processing other than image processing of enlarging, reducing, rotating, or moving the image.

10. The image processing method according to claim 9, wherein it is decided not to transmit the third image and the instruction of image processing to the first image processing unit in a case where the instruction of image processing is an instruction of image processing other than image processing of enlarging, reducing, rotating, or moving the image.

11. The image processing method according to claim 8, wherein it is decided not to transmit the third image and the instruction of image processing to the first image processing unit in a case where the instruction of image processing is an instruction of image processing other than image processing of enlarging, reducing, rotating, or moving the image.

12. The image processing method according to claim 11, further comprising:
- a step of performing, by the second image processing unit, second image processing corresponding to the instruction of image processing on the image to generate a second image after the image processing based on the image and the instruction of image processing received from the instruction receiving unit; and
- a step of controlling, by the transfer controller, the instruction receiving unit to transmit the third image and the instruction of image processing to the second image processing unit in a case where it is decided not to transmit the image and the instruction of image processing to the first image processing unit.

13. The image processing method according to claim 12, further comprising:
- a step of receiving, by the instruction receiving unit, as inputs, a plurality of images, and receiving, as inputs, one image selected from among at least one image of the plurality of images an instruction to select a print product material to which the one image is applied and an instruction of image processing to be performed on the one image;
- a step of performing, by the second image processing unit, the third image processing on the one image to generate the third image from the one image; and
- a step of deciding, by the transmission decision unit, whether or not to transmit the third image generated from the one image and the instruction of image processing to be performed on the one image to the first image processing unit based on a type of the instruction of image processing to be performed on the one image.

14. The image processing method according to claim 13, further comprising:
- a step of applying, by the first image processing unit, the third image to the print product material, and performing the first image processing on the third image to generate the first image which becomes a print product; and
- a step of controlling, by a print controller, a printer to print the same image as an image which becomes a print product on which the first image processing is not performed by the first image processing unit from among a plurality of images instead of the image which becomes the print product on which the first image processing is not performed by the first image processing unit based on a type of the print product.

15. The image processing method according to claim 12, further comprising:
- a step of applying, by the first image processing unit, the third image to the print product material, and performing the first image processing on the third image to generate the first image which becomes a print product; and
- a step of controlling, by a print controller, a printer to print the same image as an image which becomes a print product on which the first image processing is not performed by the first image processing unit from among a plurality of images instead of the image which becomes the print product on which the first image processing is not performed by the first image processing unit based on a type of the print product.

16. A non-transitory computer-readable recording medium having recorded thereon a program causing a computer to execute the steps of the image processing method according to claim 8.

* * * * *